(12) United States Patent
Huang-Fu et al.

(10) Patent No.: US 11,006,344 B2
(45) Date of Patent: May 11, 2021

(54) ENHANCED UE ROUTE SELECTION POLICY (URSP) RULE MATCHING

(71) Applicant: MEDIATEK INC., Hsin-Chu (TW)

(72) Inventors: Chien-Chun Huang-Fu, Hsin-Chu (TW); Meng-Ting Tsai, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/535,730

(22) Filed: Aug. 8, 2019

(65) Prior Publication Data

US 2020/0053622 A1 Feb. 13, 2020

Related U.S. Application Data

(60) Provisional application No. 62/717,352, filed on Aug. 10, 2018.

(51) Int. Cl.
*H04W 48/16* (2009.01)
*H04W 40/02* (2009.01)
(Continued)

(52) U.S. Cl.
CPC ........... *H04W 40/02* (2013.01); *H04L 45/306* (2013.01); *H04L 47/20* (2013.01);
(Continued)

(58) Field of Classification Search
None
See application file for complete search history.

(56) References Cited

U.S. PATENT DOCUMENTS

| 2004/0109466 A1 | 6/2004 | Van Ackere et al. | 370/419 |
| 2008/0192925 A1 | 8/2008 | Sachs et al. | 380/29 |

(Continued)

FOREIGN PATENT DOCUMENTS

| CN | 101895966 A | 7/2010 |
| CN | 102724736 A | 6/2012 |

(Continued)

OTHER PUBLICATIONS

3GPP TSG-CT WG1 Meeting #109 C1-18daaa—Route selection descriptors in a URSP rule Montreal (Canada), Feb. 26-Mar. 2, 2018 (Year: 2018).*

(Continued)

*Primary Examiner* — Brandon M Renner
(74) *Attorney, Agent, or Firm* — Imperium Patent Works; Zheng Jin (57) ABSTRACT

A method for UE route selection policy (URSP) rule matching is proposed. URSP is used by a UE to determine if a detected application can be associated to an established PDU session, can be offload to non-3GPP access outside a PDU session, or can trigger the establishment of a new PDU session. The UE first finds a non-default URSP rule with a matching traffic descriptor to the application. When the UE fails to find existing PDU session or setup new PDU session with any or the route selection descriptors of the non-default URSP rule, the UE moves to another non-default URSP rule, if any, and try the matching. If all non-default URSP rules cannot be matched with the application, then the UE tries the default URSP rule, which includes a match-all traffic descriptor.

20 Claims, 4 Drawing Sheets

(51) Int. Cl.

| | |
|---|---|
| *H04W 48/12* | (2009.01) |
| *H04L 12/813* | (2013.01) |
| *H04L 29/06* | (2006.01) |
| *H04L 12/725* | (2013.01) |
| *H04W 28/02* | (2009.01) |
| *H04W 28/12* | (2009.01) |
| *H04W 36/00* | (2009.01) |
| *H04W 36/14* | (2009.01) |
| *H04W 68/02* | (2009.01) |
| *H04W 76/27* | (2018.01) |
| *H04L 29/08* | (2006.01) |
| *H04W 28/04* | (2009.01) |
| *H04W 8/18* | (2009.01) |
| *H04W 36/08* | (2009.01) |
| *H04W 48/18* | (2009.01) |
| H04W 84/04 | (2009.01) |

(52) U.S. Cl.
CPC ........ *H04L 65/1003* (2013.01); *H04L 67/141* (2013.01); *H04L 67/146* (2013.01); *H04L 67/148* (2013.01); *H04W 8/183* (2013.01); *H04W 28/0215* (2013.01); *H04W 28/0252* (2013.01); *H04W 28/0268* (2013.01); *H04W 28/04* (2013.01); *H04W 28/12* (2013.01); *H04W 36/0022* (2013.01); *H04W 36/08* (2013.01); *H04W 36/14* (2013.01); *H04W 48/12* (2013.01); *H04W 48/18* (2013.01); *H04W 68/02* (2013.01); *H04W 76/27* (2018.02); *H04W 84/042* (2013.01)

(56) References Cited

U.S. PATENT DOCUMENTS

| | | | |
|---|---|---|---|
| 2012/0082132 A1 | 4/2012 | Andreasen et al. | 370/331 |
| 2014/0112150 A1 | 4/2014 | Ko et al. | 370/236 |
| 2014/0241264 A1 | 8/2014 | Liu | 370/329 |
| 2015/0296431 A1 | 10/2015 | Li et al. | 370/331 |
| 2015/0351021 A1 | 12/2015 | Zhang et al. | 455/432.1 |
| 2017/0135005 A1 | 5/2017 | Basu Mallick et al. | 455/434 |
| 2017/0339609 A1 | 11/2017 | Youn et al. | |
| 2018/0048537 A1 | 2/2018 | Gaikwad et al. | |
| 2018/0049218 A1 | 2/2018 | Hapsari et al. | |
| 2018/0070276 A1 | 3/2018 | Wu | |
| 2018/0220290 A1 | 8/2018 | Sivavakeesar | |
| 2018/0220338 A1 | 8/2018 | Tabe et al. | |
| 2018/0220344 A1 | 8/2018 | Shaheen | |
| 2018/0279214 A1 | 9/2018 | Chandramouli et al. | |
| 2018/0288654 A1 | 10/2018 | Shih et al. | |
| 2018/0324577 A1* | 11/2018 | Faccin | H04W 76/28 |
| 2019/0029051 A1 | 1/2019 | Pan et al. | |
| 2019/0053308 A1* | 2/2019 | Castellanos Zamora | H04L 65/1073 |
| 2019/0166647 A1 | 5/2019 | Velev et al. | |
| 2019/0174573 A1 | 6/2019 | Velev et al. | |
| 2019/0223060 A1 | 7/2019 | Zhou et al. | |
| 2019/0253870 A1 | 8/2019 | Ronneke et al. | |
| 2019/0289506 A1 | 9/2019 | Park et al. | |
| 2019/0313310 A1 | 10/2019 | Won et al. | |
| 2020/0053562 A1* | 2/2020 | Kim | H04W 76/10 |
| 2020/0053642 A1 | 2/2020 | Huang Fu et al. | |
| 2020/0154389 A1* | 5/2020 | Karampatsis | H04L 63/20 |
| 2020/0178196 A1* | 6/2020 | Wang | H04W 48/18 |

FOREIGN PATENT DOCUMENTS

| | | | |
|---|---|---|---|
| CN | 103517325 A | 6/2012 | |
| CN | 107925862 A | 8/2015 | |
| CN | 107592331 A | 7/2016 | |
| CN | 107690161 A | 8/2016 | |
| CN | 108307449 A | 8/2016 | |
| EP | 3557905 A1 | 12/2016 | |
| WO | WO2014114525 A1 | 1/2014 | |
| WO | WO2018034337 A1 | 8/2016 | |
| WO | WO2018065060 A1 | 10/2016 | |
| WO | WO2018070436 A1 | 10/2016 | |
| WO | WO2018111029 A1 | 12/2016 | |

OTHER PUBLICATIONS

International Search Report and Written Opinion of International Search Authority for PCT/CN2019/099905 dated Nov. 19, 2019 (10 pages).
C1-173817 3GPP TSG-CT WG1 Meeting #106, Ericsson et al, "5G QoS-errors in QoS rules IE", Kochi, India, Oct. 23-27, 2017 (19 pages) *sections 9, 12*.
R3-171125 3GPP TSG-RAN WG2 #95bis, Nokia et al., "PDU Session Modification Procedure", Spokane, USA, Apr. 3-7, 2017 (3 pages).
International Search Report and Written Opinion of International Search Authority for PCT/CN2019/100200 dated Nov. 14, 2019 (9 pages).
3GPP TS 23.503 V1.0.0 (Dec. 2012), 3rd Generation Partnership Project; Technical Specification Group Services and System Aspects; Policy and Charging Control Framework for the 5G System; Stage 2 (Release 15) *see 4.2.2 and 6.1.2*.
USPTO, office action for related U.S. Appl. No. 16/535,691 dated Feb. 4, 2020 (12 pages).
Taiwan IPO, office action for the TW patent application 108127878 (no English translation is available) dated Apr. 17, 2020 (7 pages).
C1-184425 3GPP TSG-CT WG1 Meeting #111bis, MediaTek Inc., "Exception handling in QoS operation", Sophia-Antipolis, France, Jul. 9-13, 2018 (8 pages). *section 6*.
Taiwan IPO, office action for the TW patent application 108128520 (no English translation is available) dated Apr. 24, 2020 (6 pages).
3GPP TS 23.503 V1.0.0 (Dec. 2017), 3rd Generation Partnership Project; Technical Specification Group Services and System Aspects; Policy and Charging Control Framework for the 5G System; Stage 2 (Release 15) *see 4.2.2, 6.1.2.2, 6.2.2*.
Taiwan IPO, office action for the TW patent application 108128251 (no English translation is available) dated Mar. 31, 2020 (6 pages).
3GPP TS 24.501 V15.0.0 (Jun. 2018), 3rd Generation Partnership Project; Technical Specification Group Core Network and Terminals; Non-Access-Stratum (NAS) protocol for 5G System (5GS); Stage 3 (Release 15), *section 4.4.2, 6.1-6.2.3, 8.3.9.1, 9.10.3-4*.
International Search Report and Written Opinion of International Search Authority for PCT/CN2019/100199 dated Oct. 30, 2019 (8 pages).
3GPP TS 23.502 V15.2.0 (Jun. 2018), 3rd Generation Partnership Project; Technical Specification Group Services and System Aspects; Procedures for the 5G System; Stage 2 (Release 15) *pp. 55-63, 125-128*.
C1-173057 3GPP TSG-CT WG1 Meeting #105, Huawei et al., "5GSM message for PDU session anchor relocation for SSC mode 2 and SSC mode 3", Krakow, Poland, Aug. 21-25, 2017 (5 pages).
International Search Report and Written Opinion of International Search Authority for PCT/CN2019/100218 dated Nov. 4, 2019 (9 pages).
International Search Report and Written Opinion of International Search Authority for PCT/CN2019/099889 dated Oct. 31, 2019 (9 pages).
3GPP TS 24.501 v15.0.0 (Jun. 2018), 3rd Generation Partnership Project; Technical Specification Group Core Network and Terminals; Non-Access-Stratum (NAS) protocol for 5G System (5GS); Stage 3 (Release 15) *clause 6.1 to 6.2.3*.
International Search Report and Written Opinion of International Search Authority for PCT/CN2019/099719 dated Oct. 31, 2019 (9 pages).
C1-184425 3GPP TSG-CT WG1 Meeting #111bis, MediaTek Inc., "Exception handling in QoS operation", Sophia-Antipolis, France, Jul. 9-13, 2018 (8 pages).
C1-184614 3GPP TSG CT WG1 Meeting #111bis, MediaTek Inc., "Exception handling in QoS operation", Sophia-Antipolis, France, Jul. 9-13, 2018 (7 pages).

(56) References Cited

OTHER PUBLICATIONS

Taiwan IPO, office action for the TW patent application 108128518 (no English translation is available) dated Jul. 10, 2020 (10 pages).
3GPP TR 24.890 V15.1.0 (Mar. 2018), 3rd Generation Partnership Project; Technical Specification Group Core Network and Terminals; 5G System—phase 1; CT WG1 Aspects (Release 15) *sections 6.1, 8.5.1.2.7, 8.5.1.3.2.1.1.3, 8.5.3.1.1, 8.5.3.1.2, 8.5.3.2.2.1, 8.5.3.2.2.3, 9.3.4, 9.5.3.1, 9.5.3.2, 10.3.2*.
USPTO, office action U.S. Appl. No. 16/535,580 dated Aug. 4, 2020 (18 pages).
USPTO, the notice of allowance for related U.S. Appl. No. 16/530,152 dated Dec. 3, 2020 (13 pages).
USPTO, office action for related U.S. Appl. No. 16/535,691 dated Sep. 23, 2020 (15 pages).
Taiwan IPO, office action for the TW patent application 108128522 (no English translation is available) dated Nov. 19, 2020 (27 pages).
3GPP TR 23.727 V0.2.0 (Jun. 2018), 3rd Generation Partnership Project; Technical Specification Group Services and System Aspects; Study on Application Awareness Interworking between LTE and NR (Release 16) *sections 2, 4, 5.1.1, 6.1.2, 6.3.1.1, 6.4.1*.
3GPP TS 23.122 V15.4.0 (Jun. 2018), 3rd Generation Partnership Project; Technical Specification Group Core Network and Terminals; Non-access-Stratum (NAS) function related to Mobile Station (MS) in idle mode (Release 15) *1.2, 2, 3.1, 4.4.3, 4.4.3.1, 4.4.3.1.1, 4.4.3.1.2, 4.4.3.3.1, 4.4.4*.
USPTO, office action for related U.S. Appl. No. 16/535,580 dated Dec. 22, 2020 (23 pages).
3GPP TR 24.890 V15.1.0 (Mar. 2018), 3rd Generation Partnership Project; Technical Specification Group Core Network and Terminals; 5G System—phase 1; CT WG1 Aspects (Release 15).

* cited by examiner

| PRECEDENCE VALUE | THE PRECEDENCE OF THEURSP RULE AMONG ALL EXISTING URSP RULES |
|---|---|
| TRAFFIC DESCRIPTOR | MATCH ALL TRAFFIC DESCRIPTOR |
| | APPLIATION IDENTIFIERS<br>IP TUPLES<br>NON-IP DESCRIPTORS<br>DNNS<br>CONNECTION CAPABILITIES<br>DOMAIN DESCRIPTORS |
| ROUTE SELECTION DESCRIPTORS | PRECEDENCE VALUE<br>　　SSC MODE<br>　　S-NSSAIS<br>　　DNNS<br>　　PDU SESSION TYPE<br>　　PREFERRED ACCESS TYPE<br>　　MULTI-ACCESS PREFERENCE<br>NON-SEAMLESS NON-3GPP OFFLOAD INDICATION |

ENHANCED UE ROUTE SELECTION POLICY (URSP) RULE MATCHING

CROSS REFERENCE TO RELATED APPLICATIONS

This application claims priority under 35 U.S.C. § 119 from U.S. Provisional Application No. 62/717,352, entitled "Performance Enhancement in 5G System", filed on Aug. 10, 2018, the subject matter of which is incorporated herein by reference.

TECHNICAL FIELD

The disclosed embodiments relate generally to wireless communication, and, more particularly, to method of enhanced UE route selection policy (URSP) rule matching in 5G new radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation. Mobile Network (NGMN) board, has decided to focus the future NGMN activities on defining the end-to-end requirements for 5G new radio (NR) systems (5GS).

The UE policies for 5GS include UE route selection policy (URSP) and access network discovery and selection policy (ANDSP). The UE policies can be delivered form a Policy Control Function (PCF) to UE. PCF takes care of network policies to manage network behavior. PCF gets the subscription information from Unified Data Management (UDM). PCF interfaces to both Access and Mobility Function (AMF) to manage the mobility context and Session Management Function (SMF) to manage the session contexts. PCF also plays a crucial role in providing a schema for network slicing and roaming. PCF triggers the URSP which enables the UE to determine how a certain application should be handled in the context of an existing or new Protocol Data Unit (PDU) session. The UE policies can also be pre-configured in UE. The pre-configured policy should be applied by UE only when UE has not received the same type of policy from the PCF.

A PDU session defines the association between the UE and the data network that provides a PDU connectivity service. Each PDU session is identified by a PDU session ID, and includes one or more QoS flows and QoS rules. When the upper layers request information of the PDU session via which to send a PDU of an application, UE should evaluate the URSP rules, except the default URSP rule, with a traffic descriptor matching the application information in increasing order of their precedence values. If the UE finds the traffic descriptor in a non-default URSP rule matching the application information, and an established PDU session matching at least one of the route selection descriptors of the URSP rule, the UE then provides information on the PDU session that matches the route selection descriptor of the lowest precedence value to the upper layers. Otherwise the UE selects a route selection descriptor with the next smallest precedence value which has not been evaluated.

If an application can find a matching traffic descriptor in a non-default. URSP rule, but there is no suitable existing PDU session and the UE fails to establish PDU session for all the route selection descriptors, the UE behavior is undefined. Further, if the application cannot match any of the non-default URSP rules, the UE behavior is also undefined.

A solution is sought.

SUMMARY

A method for UE route selection policy (URSP) rule matching is proposed. URSP is used by a UE to determine if a detected application can be associated to an established PDU session, can be offload to non-3GPP access outside a PDU session, or can trigger the establishment of a new PDU session. The UE first finds a non-default URSP rule with a matching traffic descriptor to the application. When the UE fails to find existing PDU session or setup new PDU session with any of the route selection descriptors of the non-default URSP rule, the UE moves to another non-default URSP rule, if any, and try the matching. If all non-default URSP rules cannot be matched with the application, then the UE tries the default URSP rule, which includes a match-all traffic descriptor.

In one embodiment, a UE starts an application in a mobile communication network. The UE selects a non-default URSP rule from one or more configured non-default URSP rules by matching a traffic descriptor of the non-default URSP rule with the application. The UE obtains a suitable protocol data unit (PDU) session based on a list of route selection descriptors of the non-default URSP rule. The UE selects a default URSP rule only when all the non-default URSP rules configured for the UE cannot match the application. In one example, each configured URSP rule has a precedence value, and the UE selects from the one or more configured non-default URSP rule in an order based on the precedence value.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
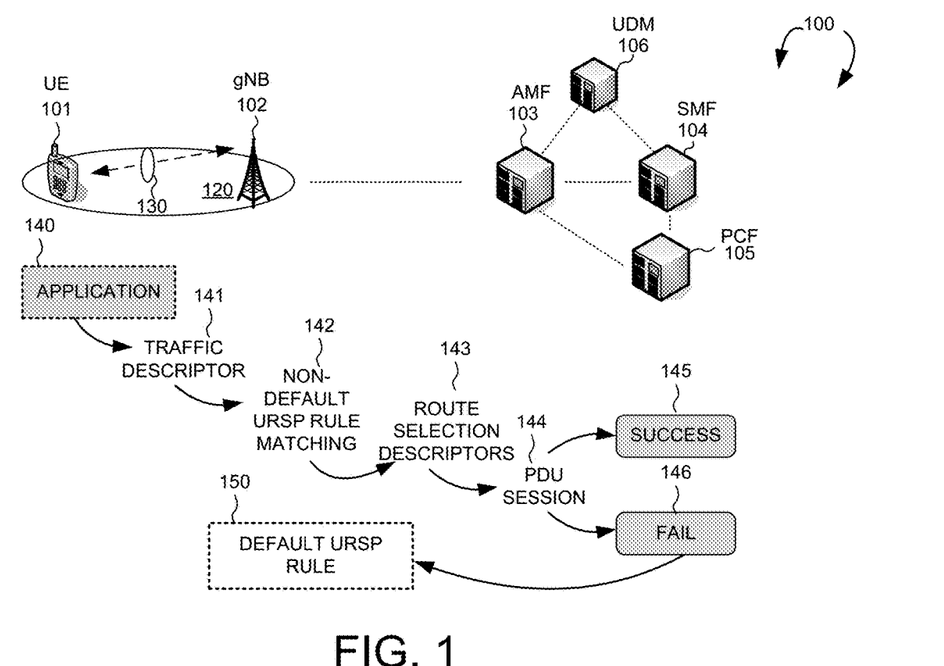
FIG. 1 illustrates an exemplary 5G network supporting enhanced User Equipment (UE) route selection policy (URSP) rule matching in accordance with one novel aspect.

FIG. 1 illustrates an exemplary 5G network 100 supporting enhanced User Equipment (UE) route selection policy (URSP) rule matching in accordance with one novel aspect. 5G new radio (NR) network 100 comprises a user equipment UE 101, a base station gNB 102, an access and mobility management function (AMF) 103, a session management function (SMF) 104, a policy control function (PCF) 105, and a unified data management (UDM) 106. In the example of FIG. 1, UE 101 and its serving base station gNB 102 belong to part of a radio access network RAN 120. In Access Stratum (AS) layer, RAN 120 provides radio access for UE 101 via a radio access technology (RAT). In Non-Access Stratum (NAS) layer, AMF 103 communicates with gNB 102 and 5GC 104 for access and mobility management of wireless access devices in 5G network 100. UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

5GS networks are packet-switched (PS) Internet Protocol (IP) networks. This means that the networks deliver all data traffic in IP packets, and provide users with Always-On IP Connectivity. When UE joins a 5GS network, a Packet Data Network (PDN) address (i.e., the one that can be used on the PDN) is assigned to the UE for its connection to the PDN. In 4G, FPS his defined a Default EPS Bearer to provide the IP Connectivity that is Always-On. In 5G, a Protocol Data Unit (PDU) session establishment procedure is a parallel procedure of a PDN connection procedure in 4G. A PDU session (e.g., 130) defines the association between the UE and the data network that provides a PDU connectivity service. Each PDU session is identified by a PDU session ID, and may include multiple QoS flows and QoS rules.

The UE policies for 5GS include UE route selection policy (URSP) and access network discovery and selection policy (ANDSP). The UE policies can be delivered form Policy Control Function (PCF) to UE. PCF takes care of network policies to manage network behavior. PCF gets the subscription information from Unified Data Management (UDM). PCF interfaces to both Access and Mobility Function (AMF) to manage the mobility context and Session Management Function (SMF) to manage the session contexts. PCF also plays a crucial role in providing a scheme for network slicing and roaming. PCF triggers the URSP which enables the UE to determine how a certain application should be handled in the context of an existing or new Protocol Data Unit (PDU) session. The UE policies can also be pre-configured in UE. The pre-configured policy should be applied by UE only when UE has not received the same type of policy from the PCF.

When UE 101 starts application 140, UE upper layers trigger URSP rule matching. UE 101 evaluates the URSP rules, except the default URSP rule, with a traffic descriptor matching the application information in increasing order of their precedence values. If UE 101 finds the traffic descriptor (141) in a non-default URSP rule (142) matching the application information, and an estabished PDU session matching at least one of the route selection descriptors (143) of the URSP rule, the UE then provides information on the PDU session that matches the route selection descriptor of the lowest precedence value to the upper layers. Otherwise the UE selects a route selection descriptor with the next smallest precedence value which has not been evaluated.

If no non-default matching URSP rule can be found and if UE local configuration for the application is available, UE 101 should perform the association of the application to a PDU session accordingly. If no matching PDU session exists, the UE NAS layer should attempt to establish a PDU session 144 using UE local configuration. If the PDU session establishment is successful (145), the UE NAS layer should provide information of the successfully established PDU session to the upper layers. Otherwise, if no non-default matching URSP rule can be found and if either. UE local configuration for the application is not available or the PDU session establishment based on UE local configuration for the application fails (146), UE 101 should perform the association of the application to a PDU session or to non-seamless non-3GPP offload according to the default URSP rule with the "match-all" traffic descriptor (150). If the association is unsuccessful, UE 101 informs the upper layers.

Figure 2:
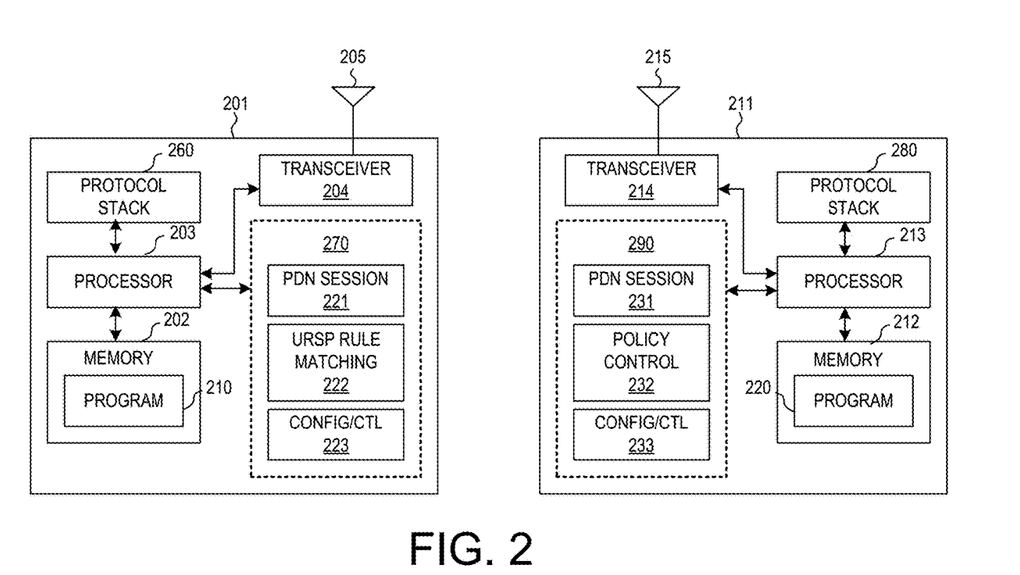
FIG. 2 illustrates simplified block diagrams of a user equipment (UE) and a base station in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session handling circuit 231 handles PDU session establishment and modification procedures. Policy control module 232 that configures policy rules for UE. Configuration and control circuit 233 provides different parameters to configure and control UE of related functionalities including mobility management and session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise application layer to manage different applications, Non-Access-Stratum (NAS) layer to communicate with an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session handling circuit 221 that performs PDU session establishment and modification procedures with the network, a policy control circuit 222 that performs URSP rule matching, a config and control circuit 223 that handles configuration and control parameters for mobility management and session management.

Figure 3:
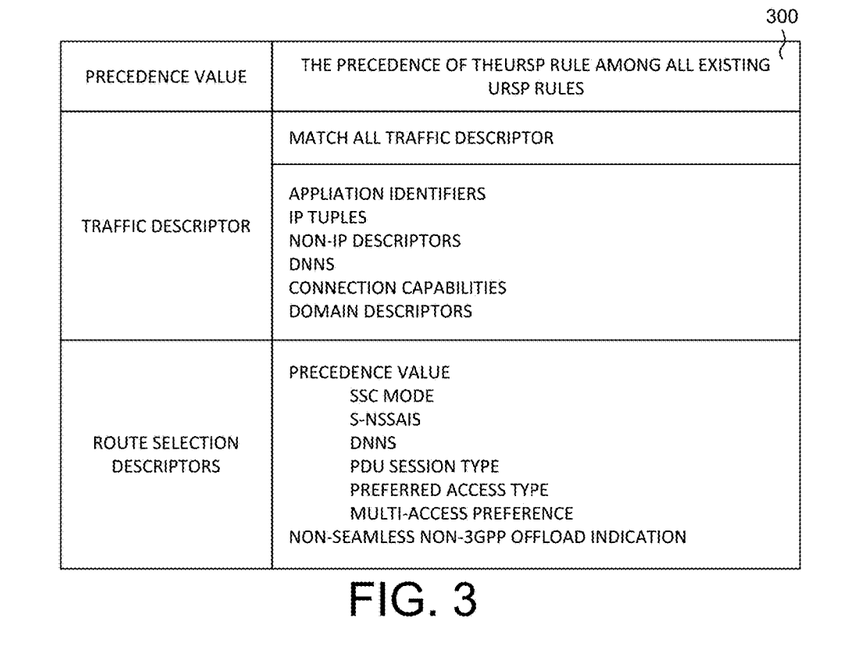
FIG. 3 illustrates the content of a URSP rule as defined in 3GPP specification.

FIG. 3 illustrates the content of a URSP rule as defined in 3GPP specification. URSP is defined as a set of one or more URSP rules. As depicted by Table 300, each URSP rule is composed of: 1) a precedence value of the URSP rule identifying the precedence of the URSP rule among all the existing URSP rules; 2) a traffic descriptor; and 3) one or more route selection descriptors. The traffic descriptor includes either 1) a match-all traffic descriptor; or 2) at least one of the following components: A) one or more application identifiers; B) one or more IP 3 tuples, i.e., the destination IP address, the destination port number, and the protocol used above the IP; C) one or more non-IP descriptors, i.e., destination information of non-IP traffic; D) one or more DNNs; E) one or more connection capabilities; and F) one or more domain descriptors, i.e., destination FQDN(s). Each route selection descriptor includes a precedence value of the route selection descriptor and either 1) one PDU session type and, optionally, one or more of the followings: A) SSC mode; B) one or more S-NSSAIs; C) one or more DNNs; D) preferred access type; and E) multi-access preference; or 2) non-seamless non-3GPP offload indication. Only one URSP rule in the URSP can be a default URSP rule and the default URSP rule should contain a match-all traffic descriptor. If a default URSP rule and one or more non-default URSP rules are included in the URSP, any non-default URSP rule should have lower precedence value (i.e., higher priority) than the default URSP rule.

Figure 4:
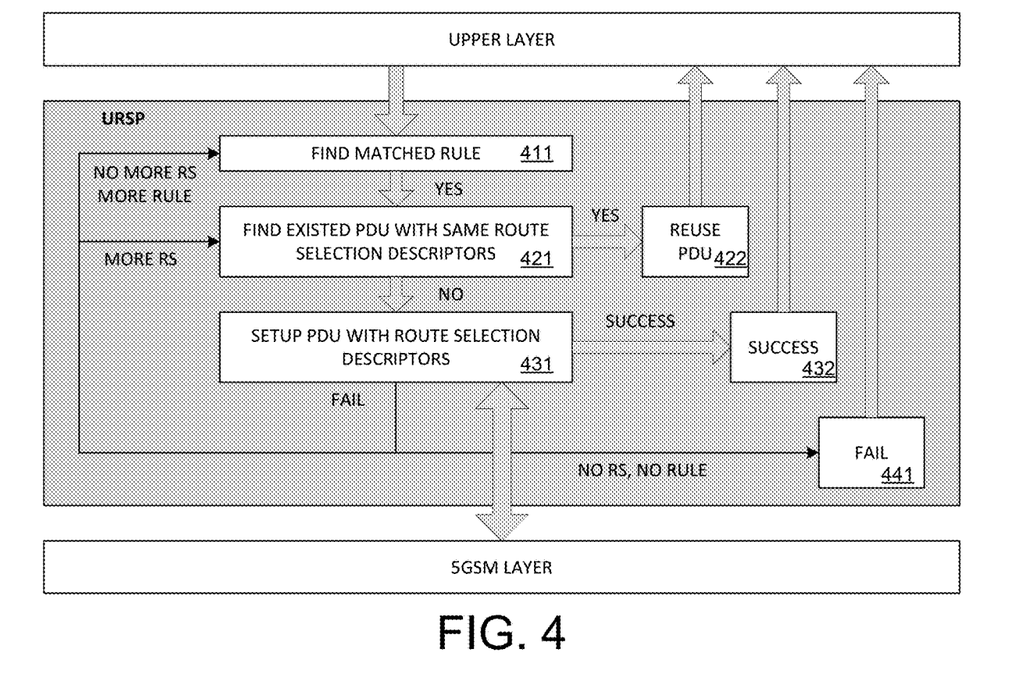
FIG. 4 illustrates different layers inside a UE for supporting enhanced URSP rule matching in accordance with one novel aspect of the present invention.

FIG. 4 illustrates different layers inside a UE for supporting enhanced URSP rule matching in accordance with one novel aspect of the present invention. URSP is used by the UE to determine if a detected application can be associated to an established PDU session, can be offload to non-3GPP access outside a PDU session, or can trigger the establishment of a new PDU session. A URSP rule includes one traffic descriptor that specifies the matching criteria and one or more of the following components: SSC mode selection policy to associated the matching application with SSC mode, network slice selection policy to associated the matching application with S-NSSAI, DNN selection policy to associated the matching application with DNN, PDU session type policy to associated the matching application with a PDU session type, non-seamless offload policy to determine that the matching application should be non-seamlessly offloaded to non-3GPP access (i.e., out of a PDU session), and access type preference indicating a preferred access (3GPP or non-3GPP) when UE needs to establish a new PDU session for the matching application.

In the embodiment of FIG. 4, to determine association between an application and a PDU session or non-seamless non-3GPP offload, UE upper layers proceed with URSP rule matching. In step 411, in increasing order of their precedence values, UE evaluates the URSP rules, except the default URSP rule, with a traffic descriptor matching the application information. For example, an application identifier included in the traffic descriptor matches with an application ID of the application. Note that if the traffic descriptor contains more than one component, then all of them need to be matched with the application information.

If the UE finds the traffic descriptor in a non-default URSP rule matching the application information, in step 421, UE tries to find one or more PDU sessions that match at least one of the route selection descriptors of the URSP rule. If the answer is yes, then UE reuses the existing PDU session in step 422 and provides information on the PDU session that matches the route selection descriptor of the lowest precedence value to the upper layers. If the answer is no, then UE goes to step 431 and the UE 5GSM layer tries to setup PDU with the same route selection descriptors. If the PDU session is successfully established, then UE goes to step 432 and provides information on the newly established PDU session. Specifically, the UE NAS layer indicates the attributes of the established PDU session (e.g., PDU session ID, SSC mode, S-NSSAI, DNN, PDU session type, access type, PDU address) to the URSP handling layer, and provides information (e.g., PDU address) of the established PDU session to the upper layers.

Otherwise, if step 431 fails, and if there are more route selection descriptors, UE selects a route descriptor with the next smallest precedence value which has not been evaluated and goes to step 421. If no more route selection descriptors for the URSP rule, then UE goes back to step 411 and tries to find a next non-default URSP rule having the next smallest precedence value, and with a traffic descriptor that matches the application information. UE continues with step 421 and step 431 to find the suitable PDU session for the next non-default URSP rule. If step 431 fails for all non-default URSP rule, then UE inform the upper layers of the failure (441). If all non-default URSP rules cannot be matched with the application, then the UE tries the default URSP rule, which includes a match-all traffic descriptor.

Figure 5:
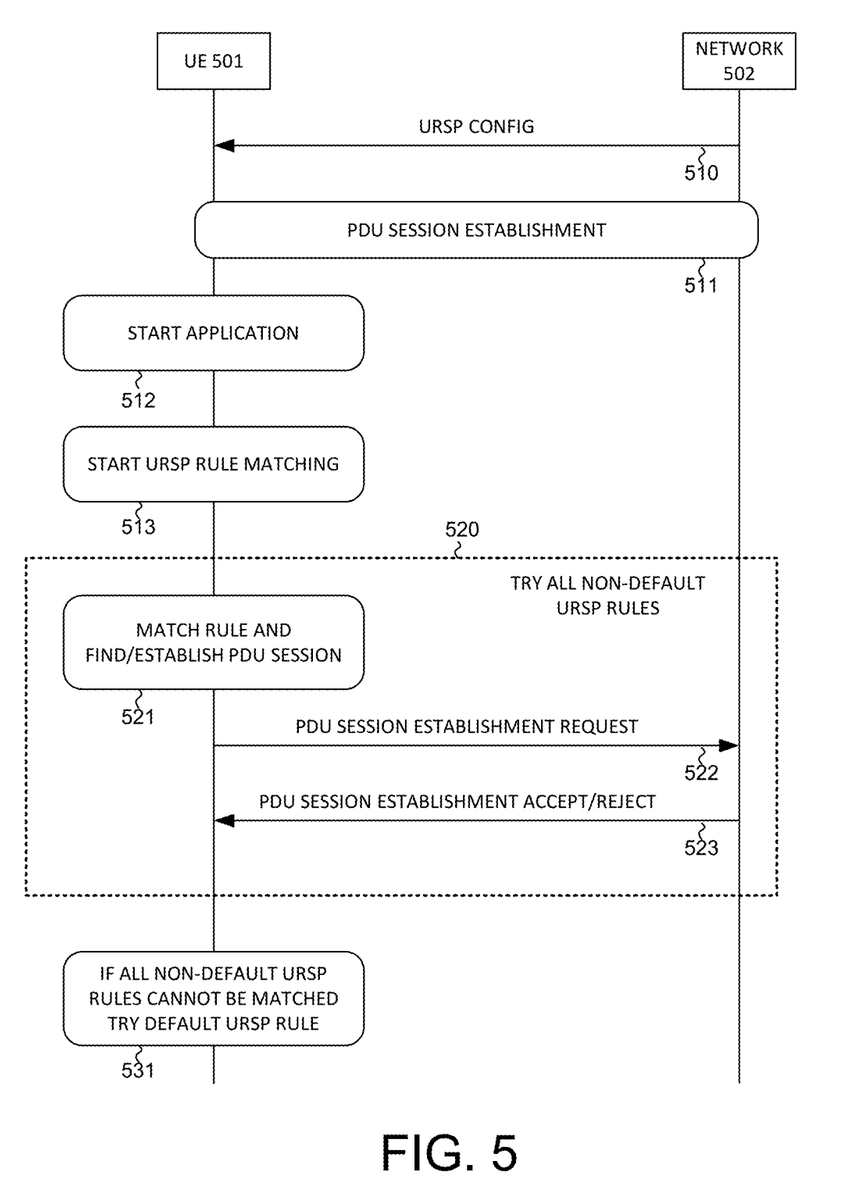
FIG. 5 illustrates a sequence flow between a UE and the network for URSP rule matching in accordance with one novel aspect of the present invention.

FIG. 5 illustrates a sequence flow between a UE and the network for URSP rule matching in accordance with one novel aspect of the present invention. In step 510, network 502 (via PCF) provides URSP configuration or update to UE 501. URSP includes a set of URSP rules, including one default URSP rule. In step 511, UE 501 and network 502 established one or more PDU sessions, each PDU session comprises information including Serving NSSAI, DNN, and PDU session ID. In step 512, UE 501 starts an application. In order to determine association between the application and a PDU session or non-seamless non-3GPP offload, UE upper layers proceed with URSP rule matching in step 513. In step 520, UE 501 tries all non-default URSP rules in an increasing order of the precedence values. Specifically, in step 521, UE 501 selects a matching URSP rule, and then either finds existing PDU session, or establishes new PDU session, that matches at least one of the route selection descriptors of the selected URSP rule. If no matching PDU sessions exists, the UE NAS layer then attempts to establish a new PDU session. For example, in step 522, UE 501 sends a PDU session establishment request to the network. In step 523, the network sends a PDU session establishment accept to UE 501 and the PDU session is established successfully. Otherwise, the network sends a PDU session establishment reject to UE 501 and the PDU session is not established. After step 520, if all non-default URSP rules cannot be matched with the application, then in step 531, UE 501 tries the default URSP rule, which includes a match-all traffic descriptor. If the association is still unsuccessful, then UE 501 informs the upper layers of the failure.

Figure 6:
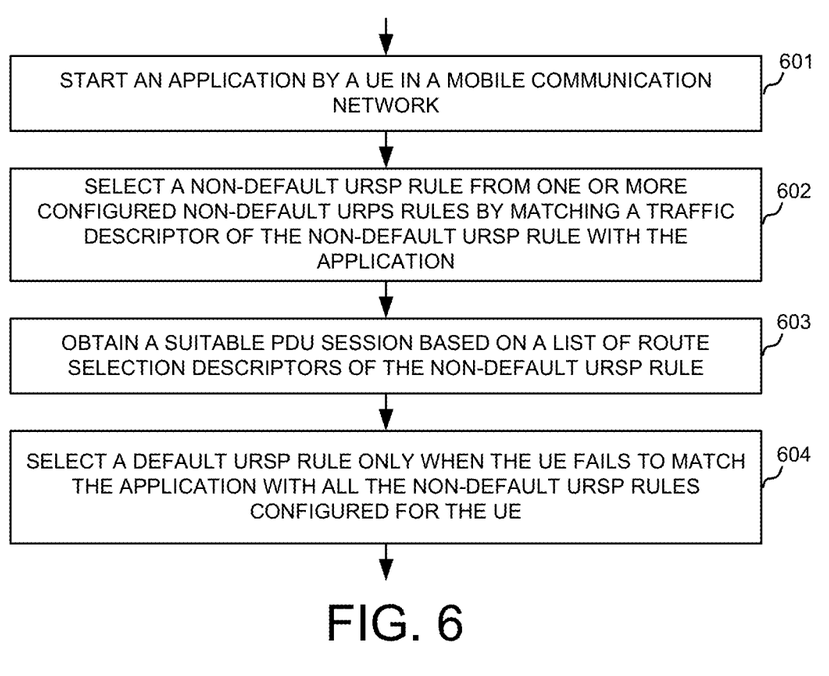
FIG. 6 is a flow chart of a method of enhanced URSP rule matching in accordance with one novel aspect of the present invention.

FIG. 6 is a flow chart of a method of enhanced URSP rule matching in accordance with one novel aspect of the present invention. In step 601, a UE starts an application in a mobile communication network. In step 602, the UE selects a non-default URSP rule from one or more configured non-default URSP rules by matching a traffic descriptor of the non-default URSP rule with the application. In step 603, the UE obtains a suitable protocol data unit (PDU) session based on a list of route selection descriptors of the non-default URSP rule. In step 604, the UE selects a default URSP rule only when the obtaining of the suitable PDU session failed for all selected non-default URSP rules configured for the UE. In one example, each configured URSP rule has a precedence value, and the UE selects from the one or more configured non-default URSP rule in an order based on the precedence value.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of User Equipment (UE) Route Selection Policy (URSP) rule matching, comprising:
   (a) starting an application by a user equipment (UE) in a mobile communication network;
   (b) selecting a non-default URSP rule from one or more configured non-default URSP rules by matching a traffic descriptor of the non-default URSP rule with the application;
   (c) obtaining a suitable protocol data unit (PDU) session based on a list of route selection descriptors of the non-default URSP rule; and
   (d) selecting a default URSP rule only when all non-default URSP rules configured for the UE do not match the application, otherwise skipping the default URSP rule and indicating a failure when the application matches at least one non-default URSP rule but fails to associate with any PDU session after evaluating all non-default URSP rules.

2. The method of claim 1, wherein the selecting in (b) involves matching all components of the traffic descriptor with the application.

3. The method of claim 1, wherein each configured URSP rule has a precedence value, and wherein the selecting in (b) is in an order based on the precedence value.

4. The method of claim 1, wherein the obtaining in (c) involves finding an existing PDU session that matches a route selection descriptor from the list.

5. The method of claim 1, wherein the obtaining in (c) involves establishing a new PDU session that matches a route selection descriptor from the list.

6. The method of claim 5, wherein the UE fails to establish the new PDU session.

7. The method of claim 1, wherein the obtaining in (c) involves evaluating each of the route selection descriptors based on a precedence value.

8. The method of claim 1, wherein the UE provides information of the suitable PDU session to the application layer upon being obtained successfully.

9. The method of claim 1, wherein the UE goes back to (b) to select a second non-default URSP rule when the obtaining of the suitable PDU session in (c) failed for the non-default URSP rule.

10. The method of claim 1, wherein the default URSP rule contains a "match all" traffic descriptor.

11. A User Equipment (UE), comprising:
    an application layer handling circuit that starts an application in a mobile communication network, wherein the application triggers UE Route Selection Policy (URSP) rule matching for the application;
    a URSP rule matching circuit that selects a non-default URSP rule from one or more configured non-default URSP rules by matching a traffic descriptor of the non-default URSP rule with the application;
    a protocol data unit (PDU) session handling circuit that obtains a suitable PDU session based on a list of route selection descriptors of the non-default URSP rule; and
    a control circuit that configures a list of URSP rules, wherein the UE selects a default URSP rule only when the UE fails to match all non-default URSP rules configured for the UE, otherwise skips the default URSP rule and indicates a failure when the application matches at least one non-default URSP rule but fails to associate with any PDU session after evaluating all non-default URSP rules.

12. The UE of claim 11, wherein the UE selects the non-default URSP by matching all components of the traffic descriptor with the application.

13. The UE of claim 11, wherein each configured URSP rule has a precedence value, and wherein the UE selects from the one or more configured non-default URSP rules in an order based on the precedence value.

14. The UE of claim 11, wherein the UE obtains the suitable PDU session by finding an existing PDU session that matches a route selection descriptor from the list.

15. The UE of claim 11, wherein the UE obtains the suitable PDU session by establishing a new PDU session that matches a route selection descriptor from the list.

16. The UE of claim 15, wherein the UE fails to establish the new PDU session.

17. The UE of claim 11, wherein the UE obtains the suitable PDU session by evaluating each of the route selection descriptors based on a precedence value.

18. The UE of claim 11, wherein the UE provides information of the suitable PDU session to the application layer upon being obtained successfully.

19. The UE of claim 11, wherein the UE select a second non-default URSP rule when the obtaining of the suitable PDU session failed for the non-default URSP rule.

20. The UE of claim 11, wherein the default URSP rule contains a "match all" traffic descriptor.

* * * * *